Sept. 14, 1943.    G. P. WITHROW    2,329,502
FLUID LEVEL INDICATOR
Filed March 19, 1941

Inventor:
Guy Pierce Withrow.
By: Q.B. McCall
Atty.

Patented Sept. 14, 1943

2,329,502

UNITED STATES PATENT OFFICE 2,329,502

FLUID LEVEL INDICATOR

Guy Pierce Withrow, Springfield, Ill.

Application March 19, 1941, Serial No. 384,213

2 Claims. (Cl. 200—84)

My invention relates to fluid level indicators, and more especially to such indicators as may be operatively used in conjunction with fluid containers.

A purpose of my invention is to provide a fluid level indicator for an occasional observation and check by an attendant, who may be interested in the protection of such mechanical equipment as may be operatively connected with the fluid containers, such as low pressure boilers, tanks, radiators, and the like.

A particular purpose of my invention is to provide a water level indicator for automobile engine radiators wherein it may be possible to keep a safe check on the water level in the radiator by being able to tell at any instant whether or not the water in the radiator has too low a level for the safe protection of the engine; with an expressed advantage in this indicator being found in the fact that when the water level is indicated as low a signal will show that fact, even before the water has a chance to become excessively hot.

I attain the objects of my invention by the device described in the specification, recited in the claims and illustrated in the drawing submitted herewith.

Referring to the drawing.

Figure 1:
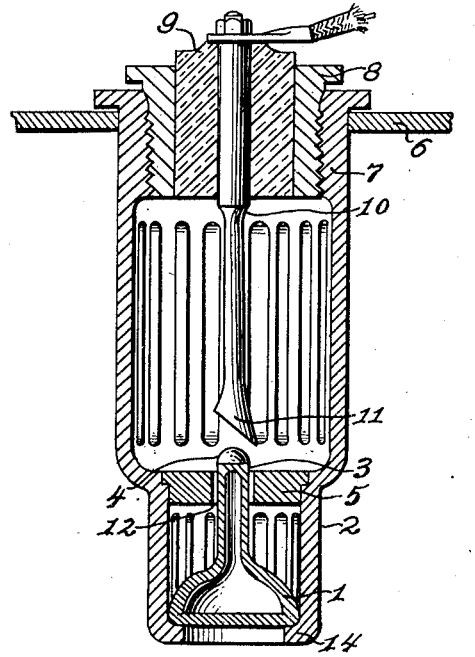
Fig. 1 is a vertical half section of my invention shown in its operative position.
Figure 4:
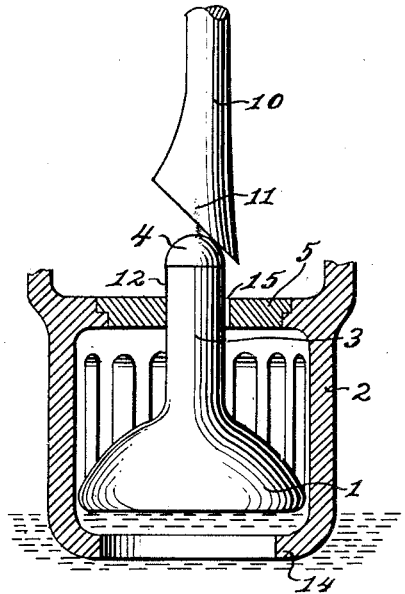
Fig. 4 is a detail showing how normal water level will force the upright float stem into a position for displaying a safety signal.
Figure 3:
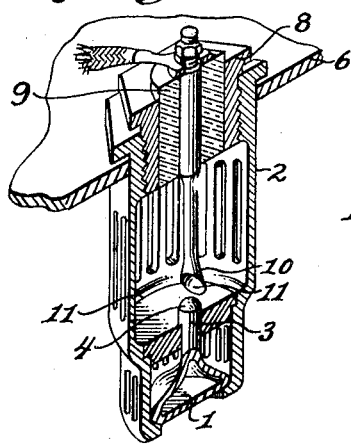
Fig. 3 is a perspective of the section shown in Figure 1.

I shall now describe the details of construction and operation of my fluid level indicator as I point out the merits thereof as shown in the drawing.

I realize that there are already on the market certain types of water level indicators adapted to be used under various operating conditions; but the simplicity of construction and operation of my invention contributes a distinct advantage to the practical way in which it may be conveniently and successfully operated.

For instance, in this application I shall describe the operating features of my invention in connection with the mechanical details thereof which would be utilized as operating parts of automobile radiator water level indicator; but it is obvious that the invention is adapted for similar use as a fluid level indicator in a number of different mechanical operating situations.

Thus to accomplish my purpose it will be noted that in the drawing I am illustrating a float member 1 operating within a float housing 2.

Float 1 has an upright stem 3 terminating at the top in a rounded or cone-shaped terminal 4, while guide 5 is used as an effective, simple and practical means of bringing the electric circuit for an indicator, to a position closely but loosely, incompassing stem 3.

When my invention is installed in a car radiator 6 preferably at the place where water is commonly put into the radiator then this water opening, having a threaded ring 7, is provided with a removable plug 8 for closing the same, and this plug 8 preferably is provided with an insulation core 9 operatively holding a fixed electrode 10 provided with a beveled or sloping bottom terminal 11 adapted to be contacted by the top terminal 4 of stem 3 when float 1 lifts stem 3.

This fixed electrode 10 is connected with a car battery while the upright stem 3 of float 1 serves as sort of a circuit breaker or circuit closer by establishing contact between the metallic stem guide 5 which is grounded with the metal of the car and the beveled terminal 11 of electrode 10 with the lifting of float 1 to a position where terminal 4 of stem 3 will force side 12 of stem 3 over against the inner annular surface 13 of electrode 5.

The bottom 14 of float guide 2 is flanged to retain float 1 in operative position.

It is conceivable that my invention will successfully work either with a bell, a buzzer, a caution light, or a signal indicator, or will successfully operate in conjunction with any desirable combination of any two or more of these signals; while it is wholly possible that a single one of these signals may be made to function with my invention; and if so then one signal would best be used as a caution signal or danger signal, when the fluid level or water level in the radiator got too low.

It will be noted that the top end 4 of upright stem 3 is rounded or tapered, and adapted to make a sliding contact with bottom bevel terminal 11 of electrode 10. This terminal 4 may be made cone shaped, if desired, so that float 1 may turn around if it floats, without effecting the efficiency of my invention. Naturally, there are practical ways of utilizing guide pins for stem 3 or stem 3 could be made rectangular or square in cross section with the guide space 15 between stem 3 guide member 5 made to conform to the shape of the cross section construction of stem 3 to prevent float 1 from turning, if desired.

Figure 2:
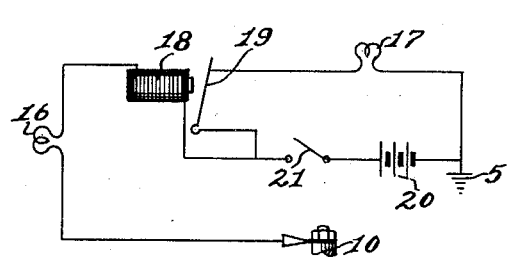
Fig. 2 is an electric circuit diagram showing the operative arrangement of my fluid level indicator.

It will be noted in Fig. 2 illustrating the circuit diagram utilizing my invention that a signal control circuit may be a green light 16 or a red light 17 both used in this connection as a safety signal or danger signal respectively; so that when float stem 3 acting as the circuit breaker or switch with its ground connection 5 operating through battery 20, contacts fixed electrode 10 at its beveled or bottom end 11, then the circuit is closed illuminating green bulb or safety signal 16 and breaking the circuit that would illuminate red bulb or danger signal 17; but when float 1 drops to a danger level where float stem 3 is not contacting terminal 11 of electrode 10 with its top end 4, then the circuit is broken causing red bulb to light showing a danger signal for the water level.

It will be noted that an induction coil 18 is utilized for automatically breaking the circuit for red bulb 17 when green bulb 16 is showing. Switch 19 is the circuit breaker for bulb 17 while switch 21 is a manually operated ignition switch.

Having thus described the nature of my invention what I claim is:

1. An electric float switch for automobile radiators comprising, a float with an upright stem terminating slopingly, and a float and stem guide for holding the same in operating limits, a fixed sloping terminal electrode downwardly extending above the stem and co-registering therewith for a glancing contact between them when fluid lifts said float and stem, a fixed metallic ring about said stem of the float for closing an electric circuit for said switch when said float lifts its stem to a glancing contact between said sloping terminals, forcing the stem to one side to contact said fixed ring and close said switch; said ring and said electrode adapted to be connected with a source of electric energy, for actuating a signal.

2. An electric float switch, comprising a float guide and an upright stem guide for the float, an upright metallic stem integral with and extending above said float defining a circuit breaker and terminating at the top in a rounded end, said stem guide having a lower annular ring loosely encompassing said stem to define an electric circuit contact surface, a central integral fixed downwardly disposed electrode terminating at the bottom in a bevel co-registering with the rounded end upright stem of the float permitting a sliding glancing contact of the stem with the electrode, effectively urging the float stem to one side when the float is lifted by a pre-determined fluid level; thus causing said stem to close the circuit between said electrode and said ring when both are connected with a source of electric energy.

GUY PIERCE WITHROW.